(12) United States Patent
Rogojina

(10) Patent No.: US 7,897,489 B2
(45) Date of Patent: Mar. 1, 2011

(54) SELECTIVE ACTIVATION OF HYDROGEN PASSIVATED SILICON AND GERMANIUM SURFACES

(75) Inventor: Elena Rogojina, Los Altos, CA (US)

(73) Assignee: Innovalight, Inc., Sunnyvale, CA (US)

( * ) Notice: Subject to any disclaimer, the term of this patent is extended or adjusted under 35 U.S.C. 154(b) by 365 days.

(21) Appl. No.: 12/140,776

(22) Filed: Jun. 17, 2008

(65) Prior Publication Data
US 2009/0311875 A1 Dec. 17, 2009

(51) Int. Cl.
H01L 21/322 (2006.01)

(52) U.S. Cl. .................. 438/475; 438/603; 438/604; 257/E21.085; 257/E21.092; 257/E21.102; 257/E21.126; 257/E21.127; 257/E21.134; 257/E21.311; 257/E21.319

(58) Field of Classification Search .................. 438/60, 438/603, 604, 463, 510, 475, 474, 752, 753, 438/933; 257/E21.085, 92, 102, 126, 127, 257/134, 311, 319
See application file for complete search history.

(56) References Cited

U.S. PATENT DOCUMENTS

| 2005/0008880 A1* | 1/2005 | Kunze et al. ............. 428/447 |
| 2007/0196297 A1 | 8/2007 | Ruckenstein et al. |
| 2008/0160265 A1 | 7/2008 | Hieslmair et al. |
| 2008/0160733 A1 | 7/2008 | Hieslmair et al. |

OTHER PUBLICATIONS

The Search Report and Written Opinion issued in PCT/US2008/067233 mailed Jun. 2, 2009.
Buriak, Jillian M., "Organometallic Chemistry on Silicon and Germanium Surfaces," Chemical Reviews, ACS, Washington D.C., vol. 102, No. 5, May 1, 2002, pp. 1271-1308.
Hua, Fengjun et al., "Efficient Surface Grafting of Luminescent Silicon Quantum Dots by Photoinitiated Hydrosilylation," "Langmuir, vol. 21, May 26, 2005, pp. 6054-6062.
Lee, Hyojin et al., "Surface-Stabilized Amorphous Germanium Nanoparticles for Lithium-Storage Material," J. Phys. Chem. B, vol. 109, No. 44, Nov. 10, 2005, pp. 20719-20723.

(Continued)

Primary Examiner—David Nhu
(74) Attorney, Agent, or Firm—Foley & Lardner LLP

(57) ABSTRACT

A method of selectively attaching a capping agent to an H-passivated Si or Ge surface is disclosed. The method includes providing the H-passivated Si or Ge surface, the H-passivated Si or Ge surface including a set of covalently bonded Si or Ge atoms and a set of surface substitutional atoms, wherein the set of surface substitutional atoms includes at least one of boron atoms, aluminum atoms, gallium atoms, indium atoms, tin atoms, lead atoms, phosphorus atoms, arsenic atoms, sulfur atoms, and bismuth atoms. The method also includes exposing the set of surface functional atoms to a set of capping agents, each capping agent of the set of capping agents having a set of functional groups bonded to a pair of carbon atoms, wherein the pair of carbon atoms includes at least one pi orbital bond, and further wherein a covalent bond is formed between at least some surface substitutional atoms of the set of surface substitutional atoms and at least some capping agents of the set of capping agents.

24 Claims, 11 Drawing Sheets

OTHER PUBLICATIONS

Linford, M. R. et al., "Alkyl Monolayers on Silicon Prepared from 1-Alkenes and Hydrogen-Terminated Silicon," J. Am. Chem. Soc., vol. 117, No. 11, Mar. 22, 1995, pp. 3145-3155.

Nelles, Jürgen et al., "Functionalization of silicon nanoparticles via hydrosilylation with 1-alkenes," Colloid and Polymer Science, Kolloid-Zeitschrift and Zeitschrift Für Polymere, Springer, Berlin, Germany, vol. 285, No. 7, Jan. 20, 2007, pp. 729-736.

Sieval, A. B. et al., "High-Quality Alkyl Monolayers on Silicon Surfaces," Advanced Materials, Wiley VCH, Weinheim, Germany, vol. 12, No. 19, Oct. 2, 2000, pp. 1457-1460.

Zhang, X. et al., "A new solution route to hydrogen-terminated silicon nanoparticles: synthesis, functionalization and water stability," Nanotechnology, Institute of Physics Publishing, vol. 18, No. 9, Mar. 7, 2007, pp. 1-6.

* cited by examiner

US 7,897,489 B2

SELECTIVE ACTIVATION OF HYDROGEN PASSIVATED SILICON AND GERMANIUM SURFACES

FIELD OF DISCLOSURE

This disclosure relates in general to semiconductors and in particular to the selective activation of hydrogen passivated silicon (Si) and germanium (Ge) semiconductor surfaces.

BACKGROUND

Semiconductors form the basis of modern electronics. Possessing physical properties that can be selectively modified and controlled between conduction and insulation, semiconductors are essential in most modern electrical devices (e.g., computers, cellular phones, photovoltaic cells, etc.). Group IV semiconductors generally refer to those first four elements in the fourth column of the periodic table (e.g., carbon, silicon, germanium and tin).

The ability to deposit semiconductor materials using non-traditional semiconductor technologies such as printing may offer a way to simplify and hence reduce the cost of many modern electrical devices (e.g., computers, cellular phones, photovoltaic cells, etc.). Like pigment in paint, these semiconductor materials are generally formed as microscopic particles, such as nanoparticles, and temporarily suspended in a colloidal dispersion that may be later deposited on a substrate.

Nanoparticles are generally microscopic particles with at least one dimension less than 100 nm. In comparison to a bulk material (>100 nm) which tends to have constant physical properties regardless of its size (e.g., melting temperature, boiling temperature, density, conductivity, etc.), nanoparticles may have physical properties that are size dependent, such as a lower sintering temperature.

A colloidal dispersion is a type of homogenous mixture consisting of two separate phases. A colloidal dispersion (or ink) generally consists of a continuous phase (such as a solvent), and a dispersed phase (generally particles under 1 um in diameter). The continuous phase must be compatible with the surface of the material to be dispersed. For example, carbon black particles (non-polar) tend to be easily dispersed in a hydrocarbon solvent (non-polar), whereas silica particles (polar) tend to be easily dispersed in alcohol (polar).

Polarity generally refers to the dipole-dipole intermolecular forces between the slightly positively charged end of one molecule to the negative end of another or the same molecule. However, semiconductor particles tend to be non-polar, and hence lyophobic (or solvent fearing).

It is often of benefit to functionalize semiconductor surfaces by the addition of capping agents in order to improve compatibility with the media and simplify and/or enable manufacturing processes. In general, a capping agent or ligand is a set of atoms or groups of atoms bound to a "central atom" in a polyatomic molecular entity. The capping agent is selected for some property or function not possessed by the underlying surface to which it may be attached.

Consequently, a common method of dispersing a non-polar particle in a polar solvent is through modification of the particle surface, often with an ionizable (or polar organic) capping agent or ligand. For example, ionizable functional groups, such as carboxyl, amino, sulfonate, etc. or polymeric forms thereof, are often covalently attached to non-polar particles in order to add charge and allow repulsive electrostatic forces aid in the dispersion of the particles in the solvent. Alternatively in the case of apolar solvents, non-ionizable organic groups, highly compatible with the solvent, may be covalently grafted to the particles to aid dispersion and impart stability via solvation forces. Examples of non-ionizable organic groups include different geometry hydrocarbons (e.g., linear, branched and cyclo-alkanes, alkenes, alkynes, cycloalkanes, alkadienes, etc.).

In addition, once dispersed, these particles will tend to stay suspended and avoid agglomeration if the repulsive electrostatic and/or solvation forces are sufficiently higher than the normally attractive Van der Waals forces. If the repulsive barrier to Van der Waals interactions is higher than about 15 kT, then Brownian motion of the particles is too low to cause appreciable agglomeration and the dispersion is considered stable. This balance of energies is the essence of Derjaguin-Landau-Verwey-Overbeek (DLVO) theory used to explain stability of electrostatically-stabilized colloids.

Capping agents can also attach antimicrobial molecules (e.g., polycationic (quaternary ammonium), gentamycin, penicillin, etc.) on a Group IV semiconductor surface in order to protect people from microbial infection. For example, Group IV materials with antimicrobial capping agents may be used for making clothing that can be more safely worn in contaminated environments.

However, in these and other uses, it is generally difficult to selectively attach the capping agent to the Group IV semiconductor surface, since the surface's chemical structure tends to be uniform and homogeneous. Consequently, the capping agent tends to attach to all available surface sites reactive toward it, completely covering the surface. This may be problematic for applications which require a direct access to the Group IV semiconductor surface. For example, an excessive amount of capping agents may inhibit sintering. Sintering is generally a method for making objects from powder by heating the particles below their melting point until they adhere to each other.

In addition, once attached to the Group IV semiconductor surface, capping ligands may be difficult to remove and may consequently interfere with the surface functionality. For example, many capping agents (once deposited and sintered) may act as contaminants which detrimentally affect the electrical characteristics of the semiconductor particle.

In view of the foregoing, there is desired a method of selectively activating hydrogen passivated Group IV semiconductor surfaces.

SUMMARY

The invention relates, in one embodiment, to a method of selectively attaching a capping agent to an H-passivated Si or Ge surface. The method includes providing the H-passivated Si or Ge surface, the H-passivated Si or Ge surface including a set of covalently bonded Si or Ge atoms and a set of surface substitutional atoms, wherein the set of surface substitutional atoms includes at least one of boron atoms, aluminum atoms, gallium atoms, indium atoms, tin atoms, lead atoms, phosphorus atoms, arsenic atoms, sulfur atoms, and bismuth atoms. The method also includes exposing the set of surface functional atoms to a set of capping agents, each capping agent of the set of capping agents having a set of functional groups bonded to a pair of carbon atoms, wherein the pair of carbon atoms includes at least one pi orbital bond, and further wherein a covalent bond is formed between at least some surface substitutional atoms of the set of surface substitutional atoms and at least some capping agents of the set of capping agents.

The invention relates, in another embodiment to a method of selectively attaching a capping agent to an H-passivated Si or Ge surface. The method includes providing the H-passivated Si or Ge surface, the H-passivated Si or Ge surface including a set of covalently bonded Si or Ge atoms and a set of surface substitutional atoms; wherein the set of surface substitutional atoms includes at least one of boron atoms, aluminum atoms, gallium atoms, indium atoms, tin atoms, lead atoms, phosphorus atoms, arsenic atoms, sulfur atoms, and bismuth atoms. The method also includes exposing the set of surface substitutional atoms to a set of capping agents, each capping agent of the set of capping agents having a set or carbon atoms arranged in an aromatic manner and a set of functional groups attached to at least some of the carbon atoms of the set of carbon atoms, wherein the set of carbon atoms includes a set of p-orbital electrons, and further wherein a set of complexes is formed between at least some surface substitutional atoms of the set of surface substitutional atoms and at least some capping agents of the set of capping agents.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
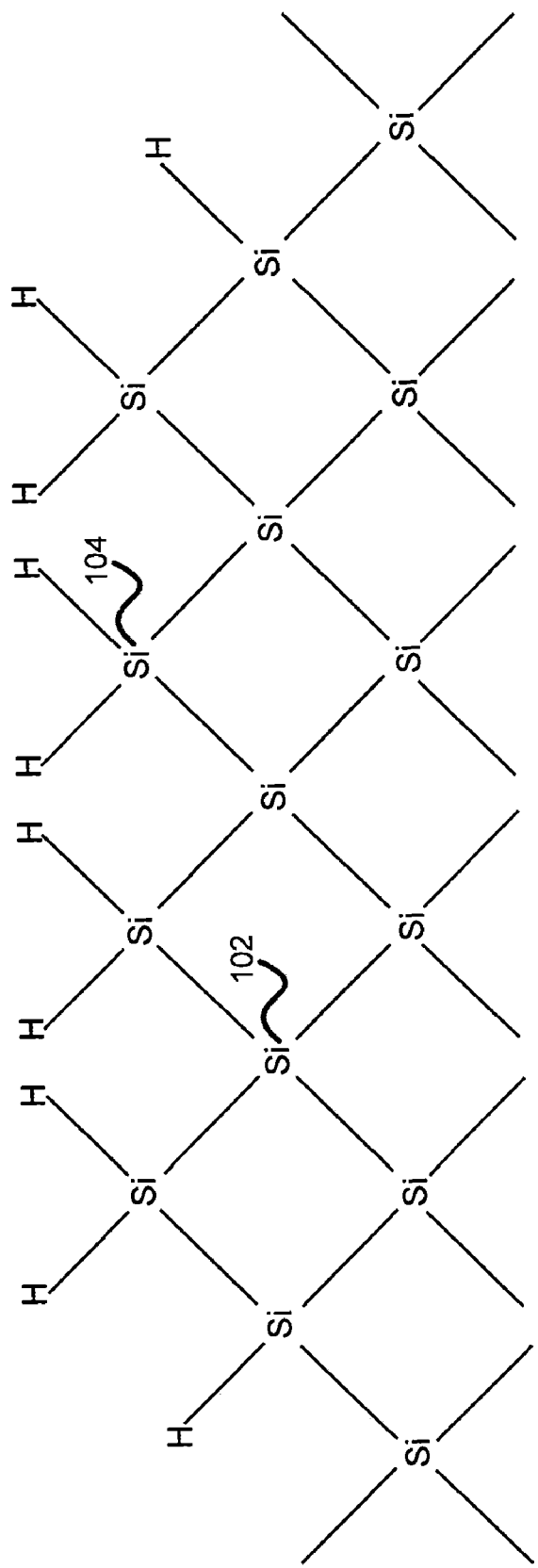
FIG. 1 shows a simplified diagram of a hydrogen-passivated Group IV semiconductor surface, in accordance with the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In general, current methods for the organic capping of an H-passivated Group IV semiconductor surfaces based on three different chemical processes. In a first method, H-passivated surfaces may be treated via Grignard chemistry routes. In another method, H-passivated surfaces may be reacted with alcohols and aldehydes. In yet another method, conjugated bonds of terminal alkenes and alkynes may be inserted between Group IV atom and Hydrogen atom. J. M. Buriak. "Organometallic Chemistry on Silicon and Germanium Surfaces" Chemical Reviews 102.5 (2002):1272-1308. In the case of H-passivated Si surfaces, such reaction is known as hydrosilylation.

In a hydrosilylation reaction, activation of the reactive atomic bond (that is, the Si—H surface bonds or the atomic bond of the capping agent atom(s) at the insertion point) may occur in several ways. For example, homolytic cleavage of the Si—H bonds with formation of surface Si radicals may be achieved thermally at about 120-150° C., by the application of a radical initiator at about 40-100° C. (depending on the initiator), or by UV (ultraviolet) light excitation (at room temperature), while conjugated bonds of alkenes/alkynes may be activated by the use of Lewis acid catalysts (such as AlCl3 or EtAlCl2) at room temperature.

Both, mono- and bi-functional terminal alkenes/alkynes carrying Phenyl, carboxyl (—COOH), ester (—COOR) and nitrile (—C≡N) groups were successfully used for capping of flat and porous H-passivated Si and Ge surfaces. However, all these bi-functional terminal alkenes/alkynes carrying functional groups except Phenyl have limited application for nanoparticle surfaces due to increased surface reactivity, thus leading to side reaction of functional groups with the nanoparticles surface during hydrosilylation.

Although all the described above methods result into successful organic capping of H-passivated Group IV surfaces, they are not selective, as capping agent molecules react with all accessible surface Group IV—Hydrogen and/or Group IV-Group IV bonds and give uniform coverage of semiconductor surfaces.

In an advantageous manner, the inventor believes that selective surface reactivity of H-passivated Si and Ge surfaces may be achieved by incorporation of surface hydride bonds of foreign (non-Si or Ge) atoms (X—H), which have a greater reactivity toward to capping agent molecules than Hydride bonds of surface Si and Ge atoms (Si—H or Ge—H). That is, selective reactivity of specific surface bonds on H-passivated Si or Ge surfaces can be achieved through the use of the surface substitutional foreign atoms X (non-Si atoms or non-Ge atoms that at a substitutional lattice site).

There is a variety of atoms, which can be incorporated in different concentrations into Si or Ge networks and forming highly reactive hydrides as well. Such examples include atoms of Group III (B, Al, Ga, In), metallic Group IV (Sn, Pb) and Group V (P, As, Sb, Bi) of the Periodic table. The choice of appropriate foreign substitutional atom in each specific case would depend on further application and selective capping conditions.

The majority of the foreign atoms, listed above as possible surface Hydride bond's activators, used as Group IV semiconductor dopants. Dopants are generally added to a semiconductor in order to alter its electrical behavior. The addition of relatively small amounts of dopants (<1%), can change the electrical conductivity of the semiconductor by many orders of magnitude by increasing the amount of electrically charged carriers. Conduction generally refers to the movement of electrically charged carriers, such as electrons or holes (i.e., lack of electrons). Depending on the kind of impurity, a doped region of a semiconductor can have more electrons (n-type) or more holes (p-type). A typical p-type dopant is boron (Group III), which lacks an outer-shell electron compared with silicon and thus tends to contribute a hole to the valence energy band. In contrast, a typical n-type dopant is phosphorous (Group V), which has an additional outer-shell electron compared with silicon and thus tends to contribute an electron to the conduction energy band.

The presence of dopant atoms on semiconductor surface can change surface reactivity as well. For example, Hydride bonds of Boron atoms, used as p dopants for Group IV semiconductors (B—H) are much more reactive than Si—H or Ge—H groups toward nucleophiles, and tend to be very efficient reducing agents for variety of organic groups. Incorporated on the H-passivated Si or Ge surfaces they will form Boron-Hydrogen bonds, which are more reactive toward nucleophiles than Si—H or Ge—H bonds. Such difference in reactivity can be explained by specifics of electron structure in sp3 configuration for Boron atoms compare to Si & Ge atoms. Group IV atoms carry four electrons in outer shell and form four bonds in a sp3 configuration. All four bonds usually equivalent, although strength of Si—H bond, for example, can be increased by the presence of electron-withdrawing groups and decreased by electron-releasing substitutents, especially SiR3. Brook, M. A., *Silicon in Organic, Organometallic, and Polymer Chemistry*. John Wiley & Sons, 1955. 171-173. As a result such activated hydrosilanes as tris(trimethylsilyl)silane $(Me_3Si)_3SiH$ becomes as effective as Sn—H bond in $(C_4H_9)_3SnH$.

However, in contrast to Si—H and Ge—H bonds, B—H groups of organic boron compounds don't require additional activation, and many of them known as a very efficient reducing agent for variety of organic functional groups. Diborane, a very common form of Boron, has a relative reactivity toward different functional groups caring conjugated bonds of (in order of greater to lesser reactivity): carboxylic acids and amides>unsaturated hydrocarbons>ketons/aldehydes>nitrites>epoxides>esters>acid chlorides. Lane, C. F. *Reduction of Organic Compounds with Diborane*. Aldrich-Boranes, 1975. Such high reactivity of B—H bonds can be explain by specifics of electron structure in sp3 configuration for Boron atoms compare to Si & Ge atoms.

A $Sp^3$ hybridized Boron atom typically carries an empty electron orbital and thus tends to exhibit Lewis acid properties. Consequently, reduction usually proceeds via complex formation between electron rich conjugated bond and Boron atom followed by addition of Boron and Hydrogen to the conjugated bond. In general, there tends to be a broad overlap between classes of organic compounds, both B—H and Group IV-H bonds are reactive to. However, the selective reactivity of B—H bonds in presence of Group IV-H bonds can be achieved by specifics of required conditions for reaction to occur. In the case of unsaturated hydrocarbons (compounds containing conjugated double and/or triple carbon-carbon bonds), very distinct differences in activation conditions tend to exist.

In contrast to surface Si—H and Ge—H bonds, which require the use of activation (thermal or otherwise) in order to interact with unsaturated hydrocarbons (terminal alkenes and alkynes), B—H surface bonds tend to interact with unsaturated hydrocarbons at room temperature. Moreover, more complex straight chain, branched and cyclic hydrocarbons with double and/or triple carbon-carbon bonds located in any part of the molecule may be used as selective capping agents for surface H-terminated substitutional Boron dopant atoms. Unsaturated hydrocarbons are generally configured as a set of Carbon atoms covalently bonded to each other via single, double or triple bonds. Usually, double or triple carbon-carbon bonds include one stronger sigma (s) bond and at least one weaker pi (π) bond.

In general, sigma bonds (σ bonds) are a type of covalent chemical bond that is symmetrical with respect to rotation about the bond axis. Sigma bonds are the strongest type of covalent pi bonds. In contrast pi bonds (π bonds) are covalent chemical bonds where two lobes of one electron orbital overlap two lobes of another electron orbital.

Referring now to FIG. 1, a simplified diagram of a hydrogen-passivated Group IV semiconductor surface, such as a silicon particle or silicon nanoparticle is shown. In general, the silicon particles may be produced in a plasma chamber, as well by other appropriate manufacturing techniques, such as evaporation (S. Ijima, Jap. J. Appl. Phys. 26, 357 (1987)), gas phase pyrolysis (K. A Littau, P. J. Szajowski, A. J. Muller, A. R. Kortan, L. E. Brus, J Phys. Chem. 97, 1224 (1993)), gas phase photolysis (J. M. Jasinski and F. K. LeGoues, Chem. Mater. 3, 989 (1991)), electrochemical etching (V. Petrova-Koch et al., Appl. Phys. Lett. 61, 943 (1992)), plasma decomposition of silanes and polysilanes (H. Takagi et al, Appl. Phys. Lett. 56, 2379 (1990)), high pressure liquid phase reduction-oxidation reaction (J. R. Heath, Science 258, 1131 (1992)) and by refluxing the zintyl salt, KSi with excess silicon tetrachloride in a solvent of glyme, diglyme, or THF under nitrogen (R. A. Bley and S. M. Kauzlarich, J Am. Chem. Soc., 118, 12461 (1996)).

Here, in internal lattice site 102 of nanoparticle or crystalline wafer, a silicon atom 202 is bonded to its four proximate silicon atom neighbors. Similarly, on a surface lattice site 104 two $sp^3$ orbitals of silicon atom used for bonding with neighboring silicon atoms and other two $sp^3$ orbitals bound to neighboring hydrogen atoms. As previously described, these hydrogen atoms serve to passivate the silicon atom.

Silicon is located in the periodic table immediately below Carbon, and like Carbon has four electrons available in its outer shell for bonding (2 electrons in the 3s orbital and 2 electrons in the 3p orbital). These s and p orbitals tend to hybridize to form four $sp^3$ orbitals. Consequently, a lower energy state may be achieved filling all the s and p orbitals in the outer silicon shell ($3s^2$ and $3p^6$) when bonded to four of its neighbors. Thus, Si is itself tetravalent and tends to form tetrahedral compounds. However, unlike carbon, silicon does not form stable double bonds because of larger atom radius limiting overlap of two π-orbitals. In genera l, bonds with electronegative elements are stronger with silicon than with carbon.

Figure 2:
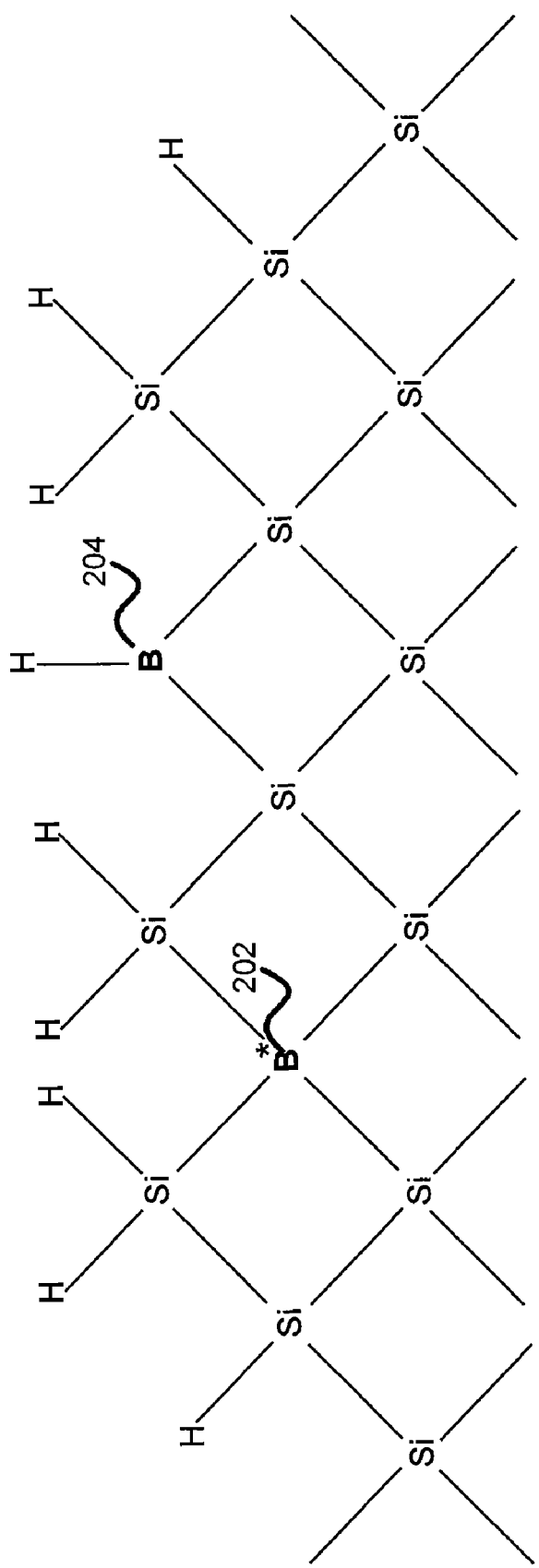
FIG. 2 shows a simplified diagram of a Group IV semiconductor surface, with the addition of a boron dopant, in accordance with the invention.

Referring now to FIG. 2, a simplified diagram of a Group IV semiconductor surface, such as a silicon particle or silicon nanoparticle, with the addition of a boron dopant. As previously described, dopant atoms (such as at 202) are often added to alter the behavior of a semiconductor insulator to a conductor. P-type dopants tend to be in the Group III column of the periodic table (boron, gallium, indium, etc.), whereas N-type dopants tend to be in Group V column of the periodic table (phosphorus, arsenic, antimony, etc). Depending on the underlying structure, dopant concentration is usually less than 1% of the total semiconductor volume.

Dopant atoms that are substitutionally positioned in a lattice tend to provide an additional electron (in the case of an n-type dopant) or the lack of an electron (or hole in the case of a p-type dopant) that is generally available for electrical current transport. In general, non-surface substitutional dopant atoms physically are not available as selective anchor points for organic capping agents because the capping agent molecules are generally larger than the lattice structure spacing.

In contrast, surface substitutional dopant atoms, such as 204, are available as selective anchor point because they are accessible to the corresponding active bond of the capping agent. Here, R 204 is bonded to two semiconductor atoms, such as Si, and a passivating atom, such as H.

This surface substitutional Boron dopant atom in $sp^3$ hybridization state has four $sp^3$ orbitals: three bonding sp3 orbitals, each carrying one unpaired electron, and fourth non-bonding empty sp3 orbital. Thus, Group III atom B 204 may be bonded via three bonding sp3 orbitals with three neighboring atoms: two Si atoms and an H atom, leaving fourth empty $sp^3$ orbital available to accept extra electron pair. Consequently, 204 may attract an electron pair donor, such as with a pi-bonded orbital (in the case of an alkene or alkyne) or a delocalized aromatic molecular orbital (in the case of a carbon-based aromatic) and form a complex.

In addition, unlike a delocalized molecular orbital which tends to be stable, a pi-bonded orbital of alkene or alkyne will further tend to open up at room temperature and create two covalent bonds between carbon atoms of conjugated bond and the Group III atom and hydrogen atom formerly attached to it.

Alkenes

Figure 3:
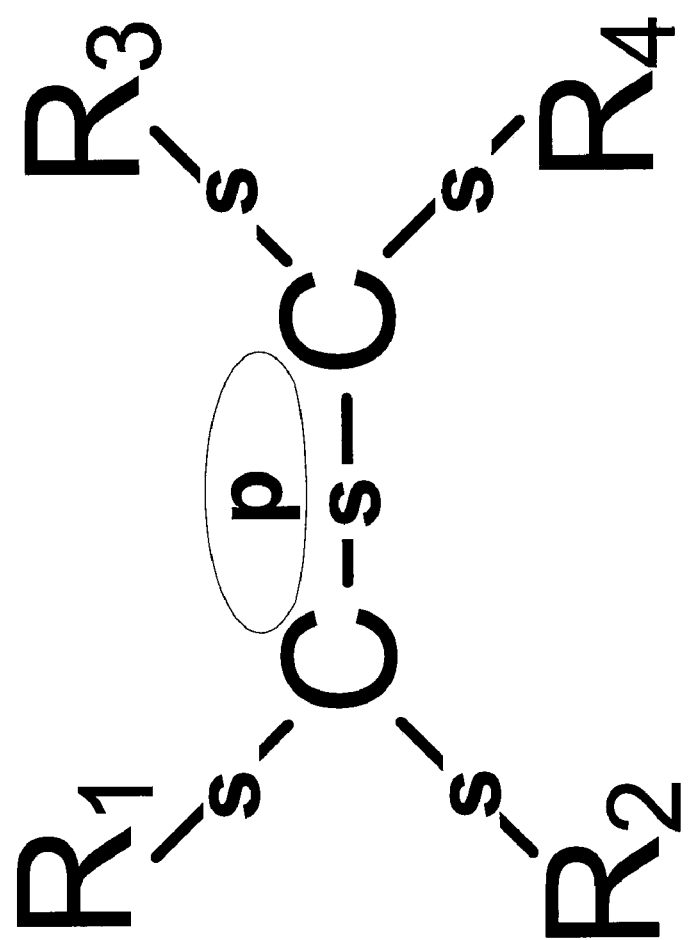
FIG. 3 shows a simplified diagram of an alkene organic capping agent, in accordance with the invention.

Referring now to FIG. 3, a simplified diagram of an alkene organic capping agent is shown, in accordance with the invention. In general, an alkene is a chemical compound containing at least one carbon-to-carbon double bond in the form a homologous series of hydrocarbons with the general formula $C_nR_{2n}$, where R includes a functional group or a hydrogen atom. The carbon atoms in an alkene are $sp^2$ hybridized. That is, the overlap of a $sp^2$ orbital from each carbon atom forms a single covalent $sp^2$-$sp^2$ sigma bond. In addition, the overlap of a p orbital from each carbon atom also forms a single pi bond that may be consequently attracted to the empty orbital of a Group III atom at room temperature, as described above.

Alkenes tend to be relatively stable compounds, but are more reactive than alkanes due to the presence of a carbon-carbon pi-bond. The majority of the reactions of alkenes involve the rupture of this pi bond, forming new single covalent bonds.

Alkynes

Figure 4:
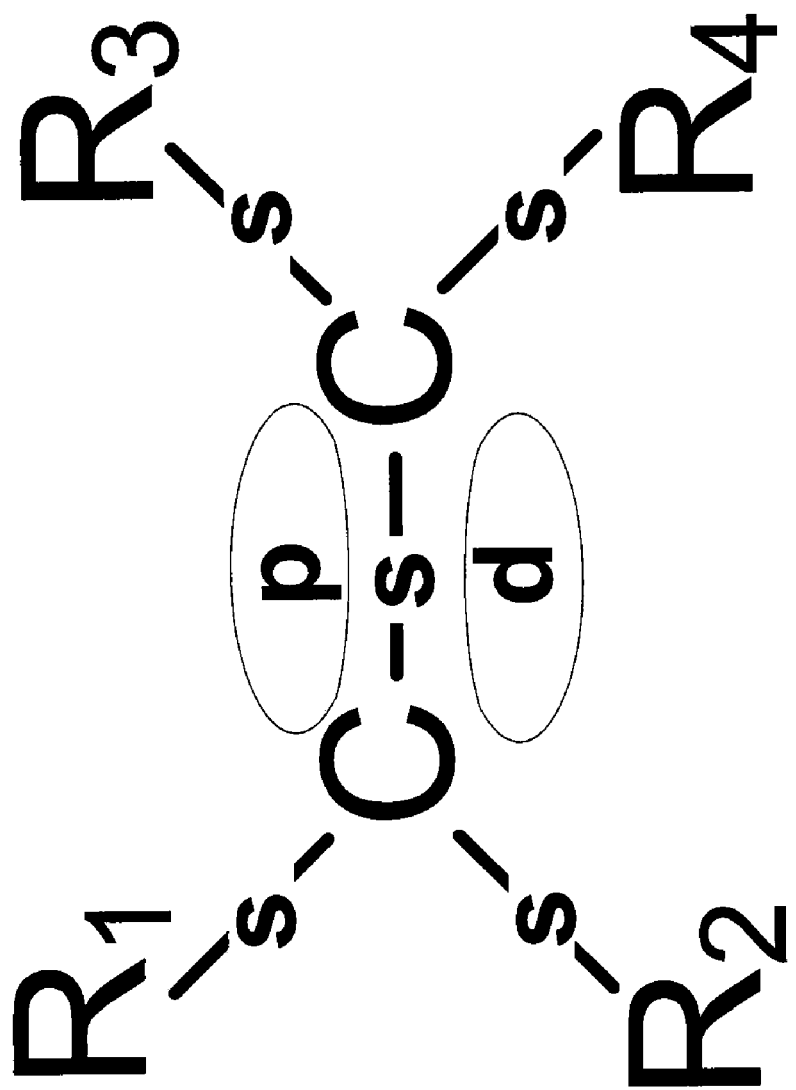
FIG. 4 shows a simplified diagram of an alkene organic capping agent, in accordance with the invention.

Referring now to FIG. 4, a simplified diagram of an alkene organic capping agent is shown, in accordance with the invention. Alkynes are hydrocarbons that have at least one triple bond between two carbon atoms, with the formula $C_nR_{2n-2}$, where R includes a functional group or a hydrogen atom. Carbon atoms in an alkyne bond are sp hybridized. That is, they each have sp hybrid orbitals that overlap to form a single sp-sp sigma bond, as well as 2 p orbitals that overlap to form two corresponding pi bonds. As with alkenes, the pi bonds may be consequently attracted to the empty orbital of a boron atom at room temperature, as described above. However, unlike alkanes, and to a lesser extent, alkenes, alkynes are unstable and reactive.

Carbon-Based Aromatics

Figure 5:
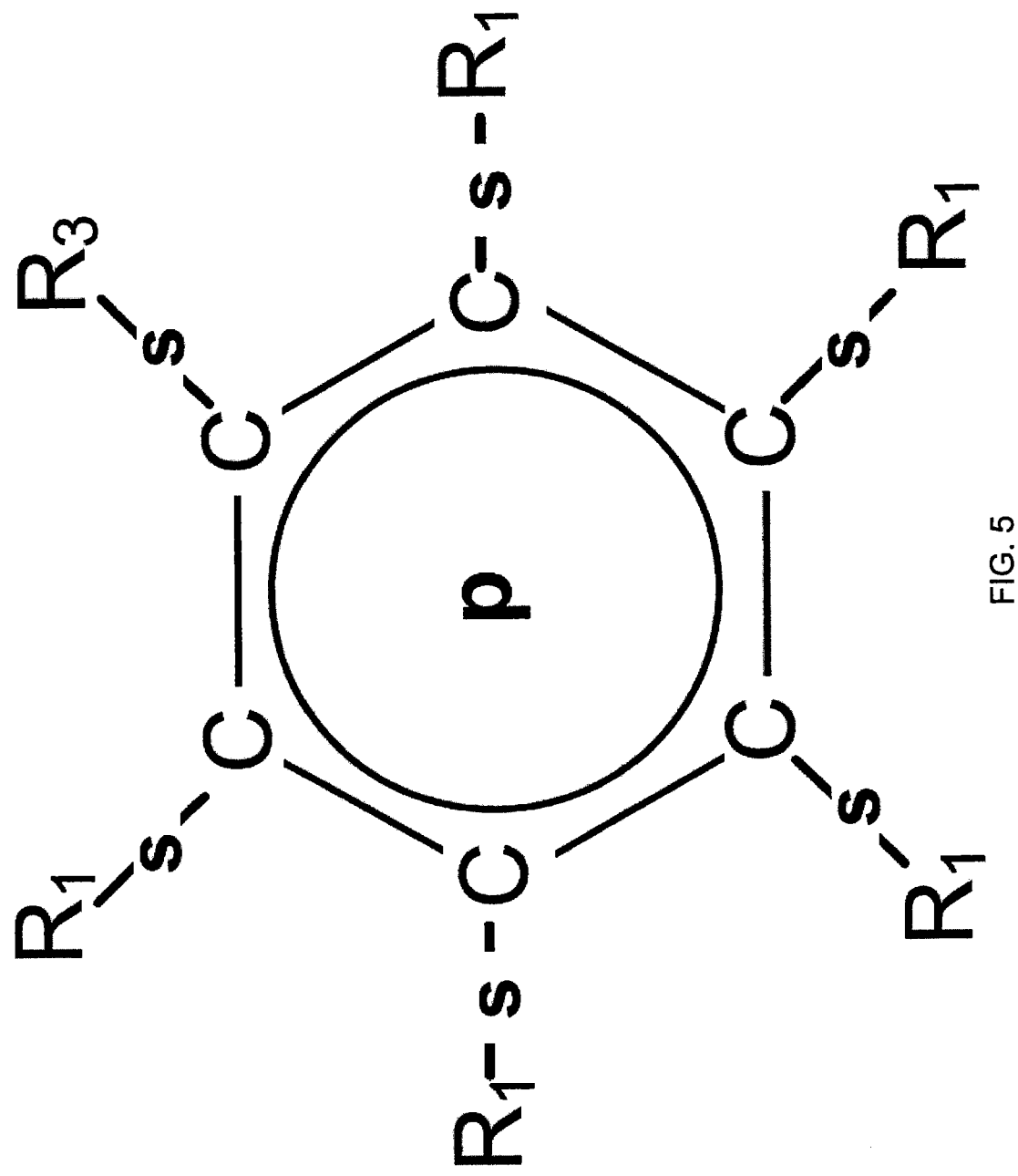
FIG. 5 shows a simplified diagram of an alkene organic capping agent, in accordance with the invention.

Referring now to FIG. 5, a simplified diagram of an alkene organic capping agent is shown, in accordance with the invention.

Aromaticity is generally a chemical property in which a conjugated ring of coplanar atoms with unsaturated bonds exhibit stabilization stronger than would be expected by the stabilization of conjugation alone. That is, p-orbital electrons form an evenly distributed region, above and below the ring formed by the circular arrangements of atoms. Aromatic molecules typically display enhanced chemical stability, compared to similar non-aromatic molecules. In addition, like alkenes and alkynes, the pi bonds may be consequently attracted to the empty orbital of a boron atom at room temperature.

EXAMPLE 1

Figure 6A:
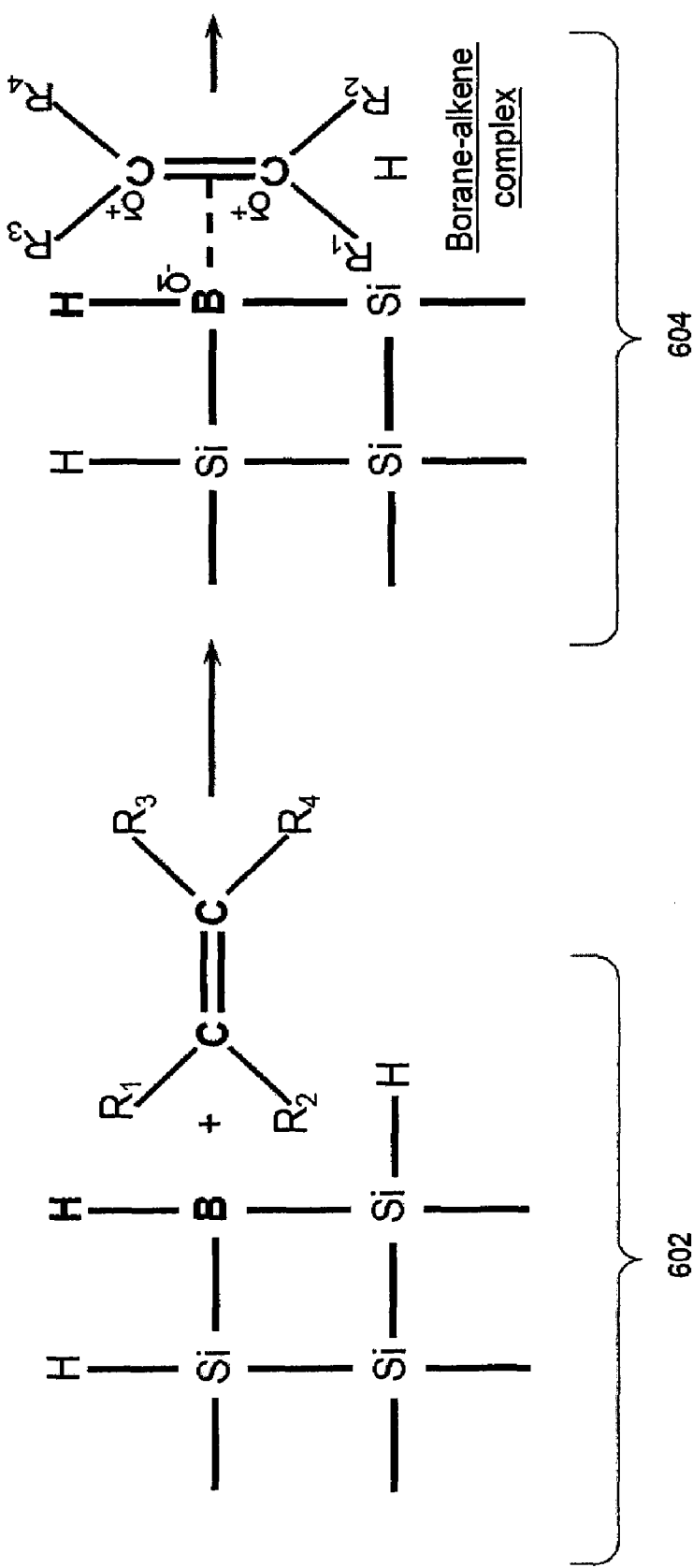
FIGS. 6A-6B show a simplified diagram of a hydroboration interaction between an alkene and a surface H-passivated substitutional boron atom, in accordance with the invention.
Figure 6B:
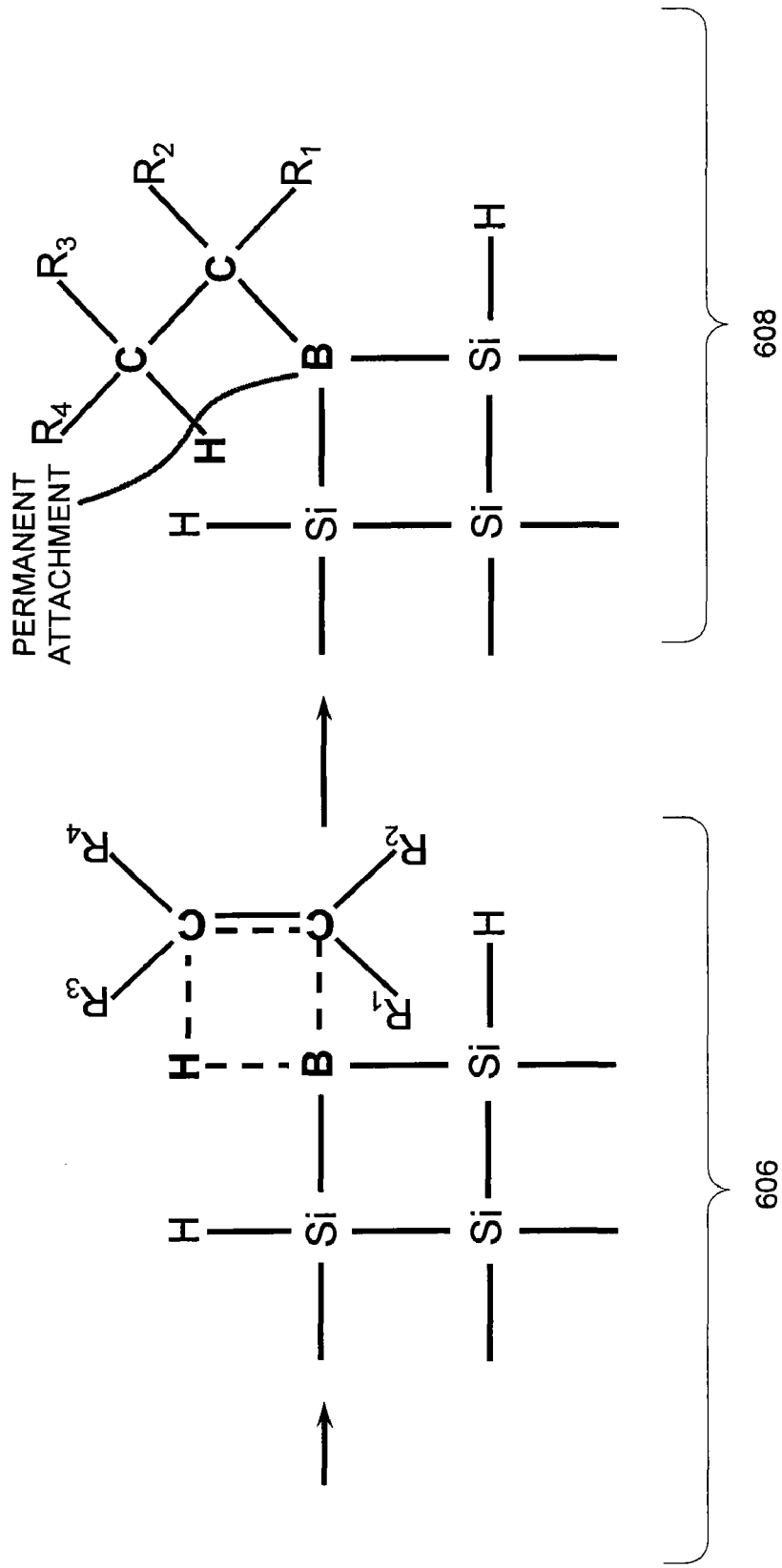

FIGS. 6A-6B show a simplified diagram of hydroboration interaction between an alkene and a surface H-passivated substitutional boron atom, in accordance with the invention. Here, a simplified H-passivated Si semiconductor surface is shown with a surface substitutional boron atom (although other Group III atoms may be used). In addition, a hydrogen atom is also covalently bonded to the boron atom.

Initially, at 602, a surface substitutional boron atom is exposed to the alkene. At 604, the set of negative locally charged pi-orbital electrons in the alkene molecule tend to be attracted to the empty orbital in a surface substitutional boron atom, initially forming a dipole complex at the semiconductor surface. That is, the carbon atoms at double bond of alkene molecule become more locally positive while boron atom at the surface becomes more locally negative.

However, at 606, as alkene molecule approaches the boron atom, pi-bond opens up in such fashion that four-center transition state formed, where one of the pi-orbitals (corresponding to Carbon atom with greater amount of Hydrogen atoms) now shares electron with the boron atom, and another one interacts with H-atom. Consequently, at 608, a covalent bond is being formed between the less branched carbon and the boron, and the hydrogen atom migrates from boron to more branched carbon atom, resulting in another covalent bond. Thus, the interaction of boron with an alkene results in a permanent (covalent) attachment of the alkene molecule. Alkynes, like alkenes, will also form a permanent attachment using the same mechanism.

Figure 6C:
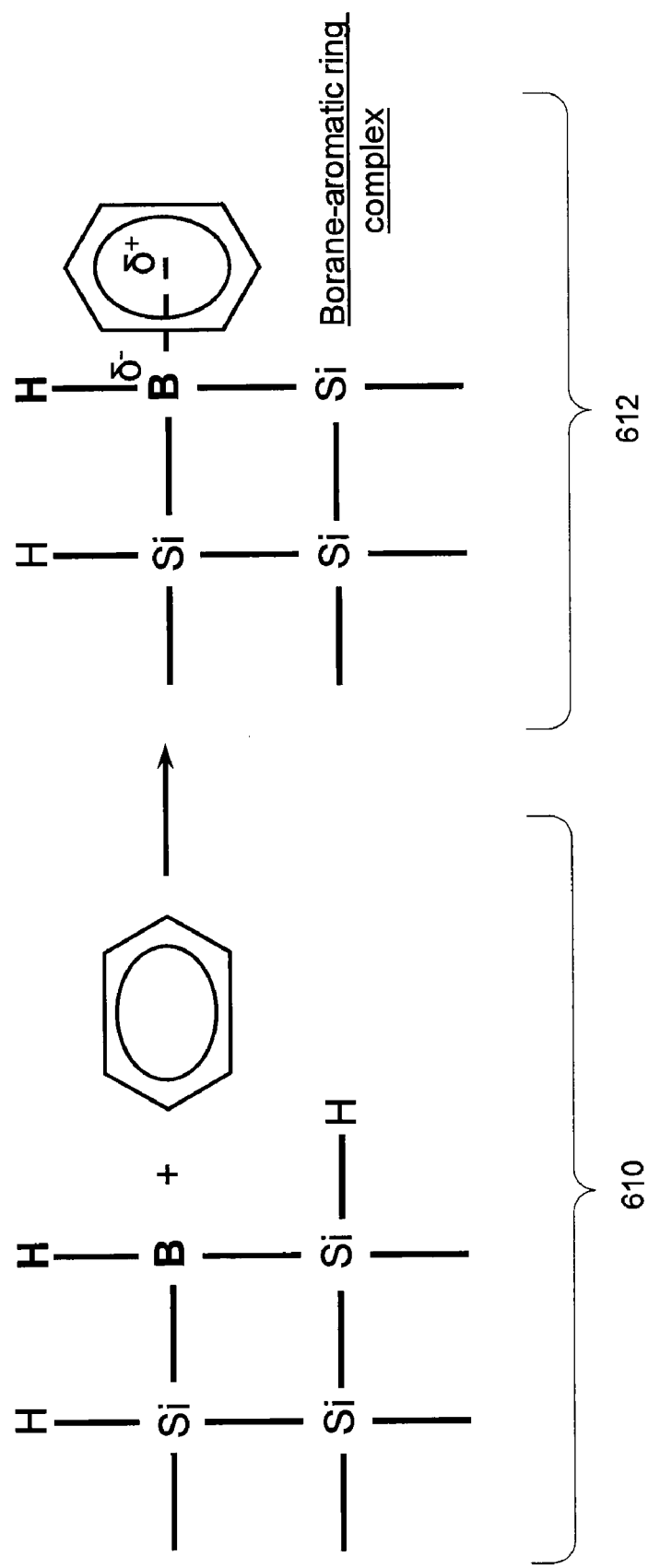
FIG. 6C shows a simplified diagram of interaction between an carbon-based aromatic molecule and a surface H-passivated substitutional boron atom, in accordance with the invention.

FIG. 6C shows a simplified diagram of interaction between a carbon-based aromatic molecule and a surface H-passivated substitutional boron atom, in accordance with the invention. Here, a simplified Group IV semiconductor surface is shown with a surface substitutional boron atom (although other Group III atoms may be used). In addition, a hydrogen atom is also covalently bonded to the boron atom.

Initially, at 610, a surface substitutional boron atom is exposed to the aromatic molecule. At 612, the set of negative locally charged pi-orbital electrons in the aromatic molecule tend to be attracted to the empty orbital in a surface substitutional boron atom, initially forming a dipole complex at the semiconductor surface. That is, the carbon atoms forming aromatic ring become more locally positive while boron atom at the surface becomes more locally negative. However, unlike a pi-bonded orbital of alkene or alkyne which will further decompose and create a covalent bond with the boron atom, delocalized molecular orbital of aromatic ring tend to be stable, and no further reaction occurs. Thus, no permanent attachment of carbon-based aromatic molecules to the p-doped semiconductor surface occurs, however such complex formation may enhance the p-doped surface solvation with aromatic solvents.

Figure 7:
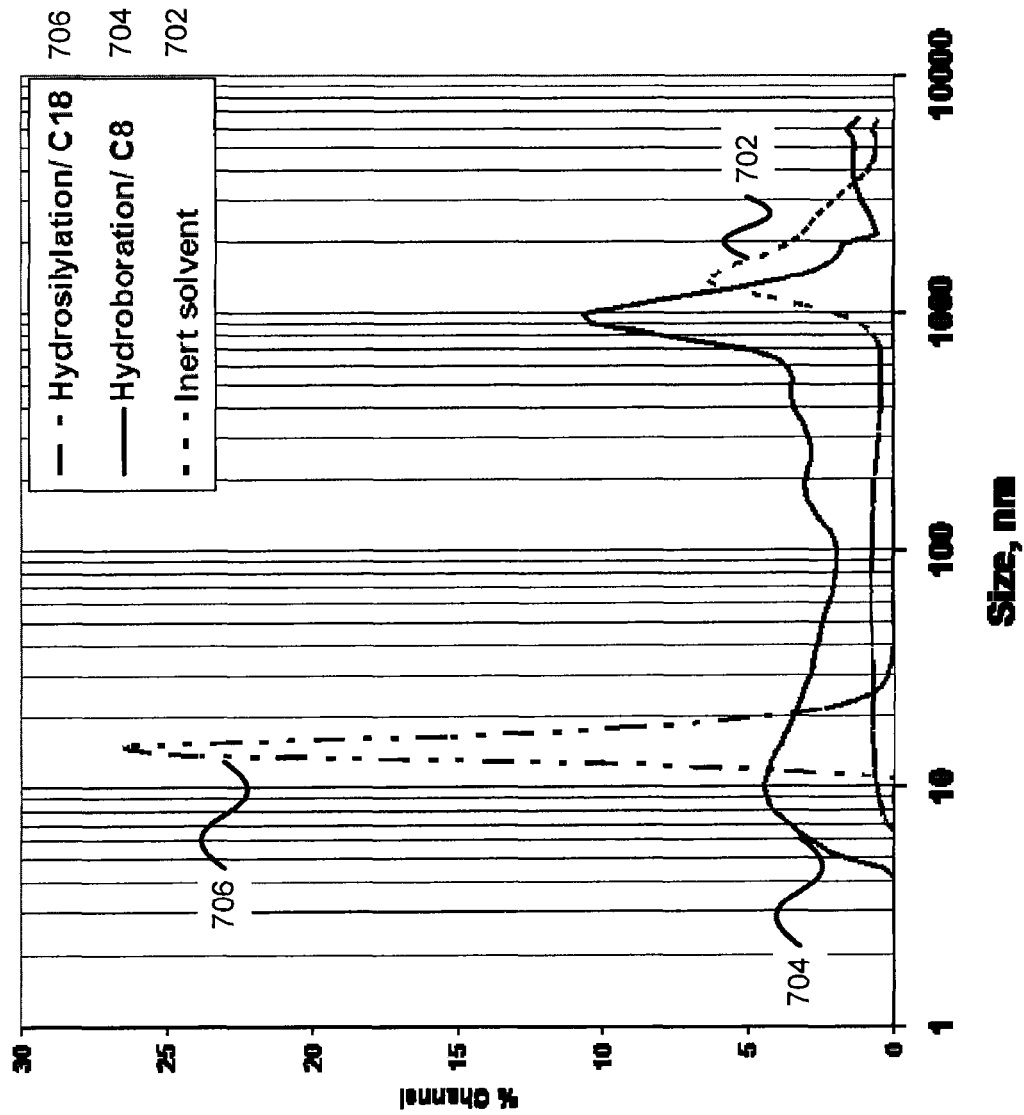
FIG. 7 shows a simplified particle size distribution diagram as measured by dynamic light scattering, in accordance with the invention.

Referring now to FIG. 7, a simplified particle's size distribution diagram as measured by dynamic light scattering is showing the dispersion effectiveness of various capping agents, in accordance with the invention.

Generally, dynamic light scattering quantifies the particle size distribution by measuring the power spectrum of frequency shifted, scattered light arising from random thermal (Brownian) motion of the suspended particles. These frequency (Doppler) shifts are related to the particle velocities, where smaller particles generally have higher velocities and therefore larger Doppler shifts. In the heterodyne method employed here, a coherent laser light source is directed at the suspension of particles, and the frequency-shifted, back-scattered light due to particle motions is recombined with part of the incident, unshifted light. The resulting interference pattern relates to the distribution of Doppler shifts. Thus, particle size distribution is obtained by analysis of the detected heterodyne power spectrum.

Horizontal axis shows particle agglomerate size (average size for that bin or "channel") in a logarithmic nanometer (nm) scale, while vertical axis shows % channel (e.g., the percentage of particles in the size range of that channel). In general, in colloidal dispersions of nanoparticles, the particles tend to form agglomerates in order to reduce their surface energy. Agglomerates may comprise relatively weak bonds between the nanoparticles (i.e. a potential energy minimum on the order of a few kT), and can be easily disassociated with the addition of small mechanical or thermal energy. Thus, in general, the larger the size of underlying nanoparticle, the larger the corresponding size of the agglomerate.

A first reference colloidal dispersion 702 is loaded with H-passivated Si nanoparticles in an inert solvent. A second colloidal dispersion 704 loaded with H-passivated Si nanoparticles hydroborated with an alkene capping agent (room temperature reaction). A third colloidal dispersion 706 is loaded with Alkyl-passivated Si particles obtained from H-passivated Si nanoparticles, hydrosilylated with an alkene capping agent (high temperature reaction) and purified by selective precipitation.

To prepare colloidal dispersions 702 (inert solvent) and 704 hydroboration with alkene), particles and solvent(s) were mixed and the mixture was stirred for 30 min by stirring at room temperature followed by about a 15 min ultrasonic horn sonication at about 15% power. Colloidal dispersion 706 was prepared by dissolution of Alkyl-passivated Si nanoparticles in organic solvent. The colloidal dispersions 704 and 706 were further filtered through 0.45 micron PTFE filter. The dispersion 702 with Si particles in inert solvent could not be filtered through this kind of filter with such small pore size due to clogging, and it was measured without filtration.

In general, for a particle in a solvent, the percentage of capped surface area is substantially correlated to the degree of dispersability. That is, highly capped particles disperse well, while lightly capped or uncapped particles disperse poorly and tend to clump and precipitate out of the solvent.

In the first reference colloidal dispersion 702 with Si nanoparticles, the dispersion has an average agglomerate size of about 1100 nm. In contrast, the third colloidal dispersion 706 with hydrosilylated Si nanoparticles has an average agglomerate size of about 11 nm, corresponding to an individual particle size, implying substantial nanoparticle surface coverage. Colloidal dispersion 704 with hydroborated Si nanoparticles has an average agglomerate size somewhere in between, with a main peak of about 1000 nm. Although an aggregate size for the dispersion 704 with hydroborated Si nanoparticles is closer to the dispersion 702 with Si nanoparticles in inert solvent, this dispersion 704 was filtered before measurement through 0.45 micron filter. Thus, the inventor believes that the initial aggregate's size for this dispersion is below 0.45 micron, and the peak with larger 1000 nm aggregate size is observed due to re-aggregation occurred after filtration.

Figure 8:
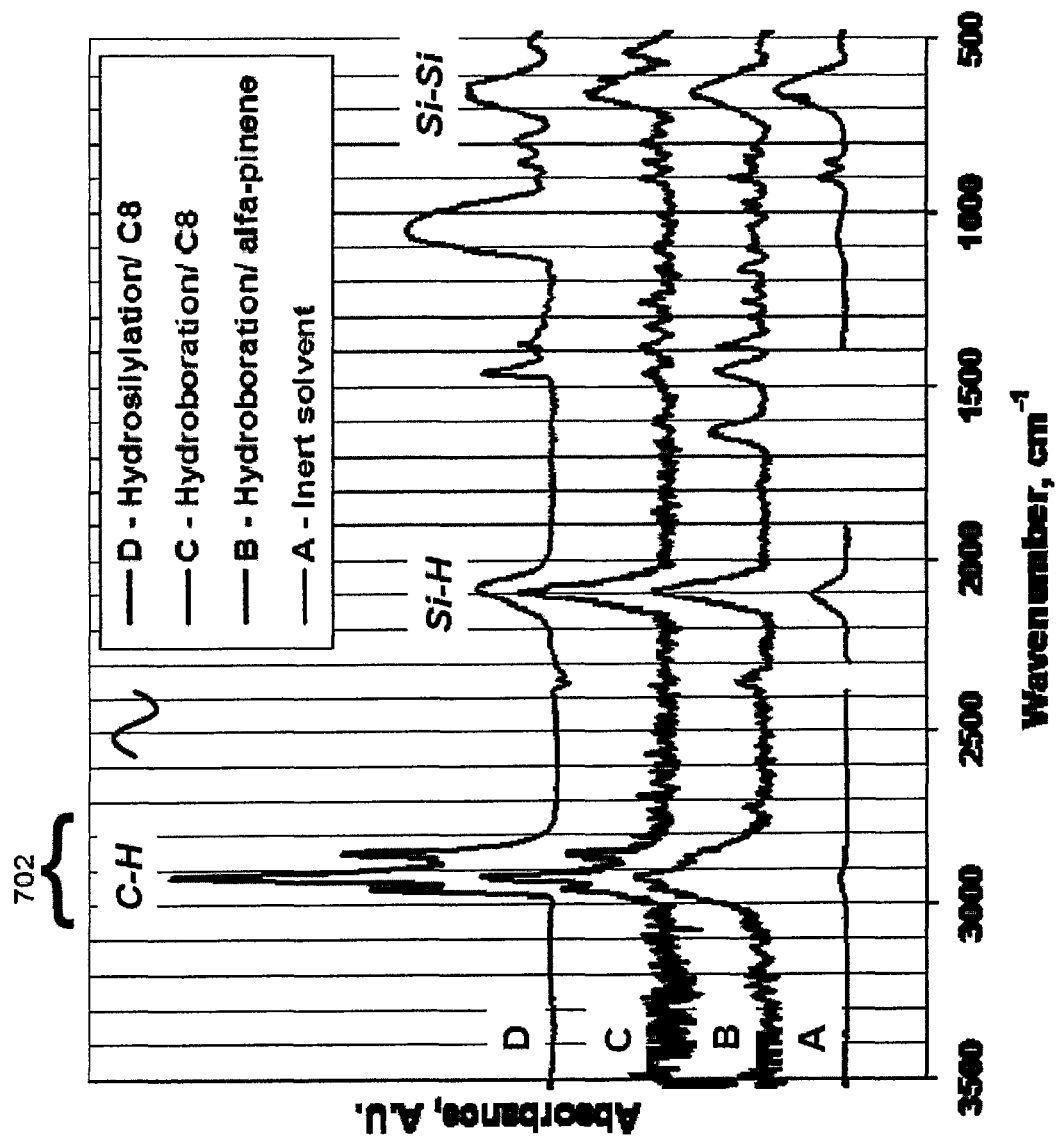
FIG. 8 shows FTIR spectra of dried films deposited from several colloidal dispersions of silicon particles treated with various capping agents, in accordance with the invention; and, FIG. 9 shows a simplified diagram of conductivity for a set of densified films made from various capped and uncapped silicon nanoparticles, in accordance with the invention.

Referring now to FIG. 8, FTIR spectra of dried films deposited from several colloidal dispersions of Silicon particles treated with various capping agents are presented, in accordance with the invention.

In general, Fourier transform infra-red (FTIR) spectroscopy is a measurement technique whereby spectra are collected based on measurements of the temporal coherence of a radiative source, using time-domain measurements of the electromagnetic radiation or other type of radiation (shown as wavenumber on the horizontal axis). At certain resonant frequencies characteristic of the specific sample, the radiation will be absorbed (shown as absorbance A.U.) on the vertical axis) resulting in a series of peaks in the spectrum, which can then be used to identify the samples. A set of peaks 702 in the range 2850-3000 $cm^{-1}$, is representative of a hydrocarbon bonds present in capping ligands on the particle's surface.

Here, a set of porous thin film compacts were formed by depositing a colloidal dispersion of p-type silicon nanoparticles on FTIR transparent substrates. These thin films were then baked at about 60-350° C. from 5 to 30 minutes, in order to remove any remaining solvent and capping agent. Four sets of porous compacts in total were made: (A) uncapped nanoparticles in an inert solvent, (B) nanoparticles hydroborated with alfa-pinene (room temperature treatment), (C) nanoparticles hydroborated with a C8 alkene (room temperature treatment), and (D) C8 nanoparticles hydrosilylated with a C8 alkene (high temperature treatment). These porous compacts were then measured using FTIR as described above.

FTIR spectra of dried films printed from several colloidal dispersions were normalized by Si—Si signal intensity (~640 cm−1). Thus, the intensity of hydrocarbon peaks in the range 2850-3000 $cm^{-1}$ becomes a reflection of the degree of permanent capping with various capping agents. As it can be seen, C8 nanoparticles hydrosilylated with a C8 nanoparticles (D) show a set of intense peaks in the range 2850-3000 $cm^{-1}$ characteristic of hydrocarbon absorption corresponding to substantial nanoparticle surface coverage, uncapped nanoparticles in an inert solvent (A) show no substantial peak and thus minimal nanoparticle surface coverage, and nanoparticles hydroborated with alfa-pinene (B) and nanoparticles hydroborated with a C8 alkene (C) show an interim nanoparticle surface coverage. Consequently, the inventor believes that this lower intensities of hydrocarbon peak for the films B and C from hydroborated Si nanoparticles dispersions versus the film D from Alkyl-passivated Si nanoparticles (hydrosilylation) confirms partial capping of Si nanoparticles surface through hydroboration.

Figure 9:
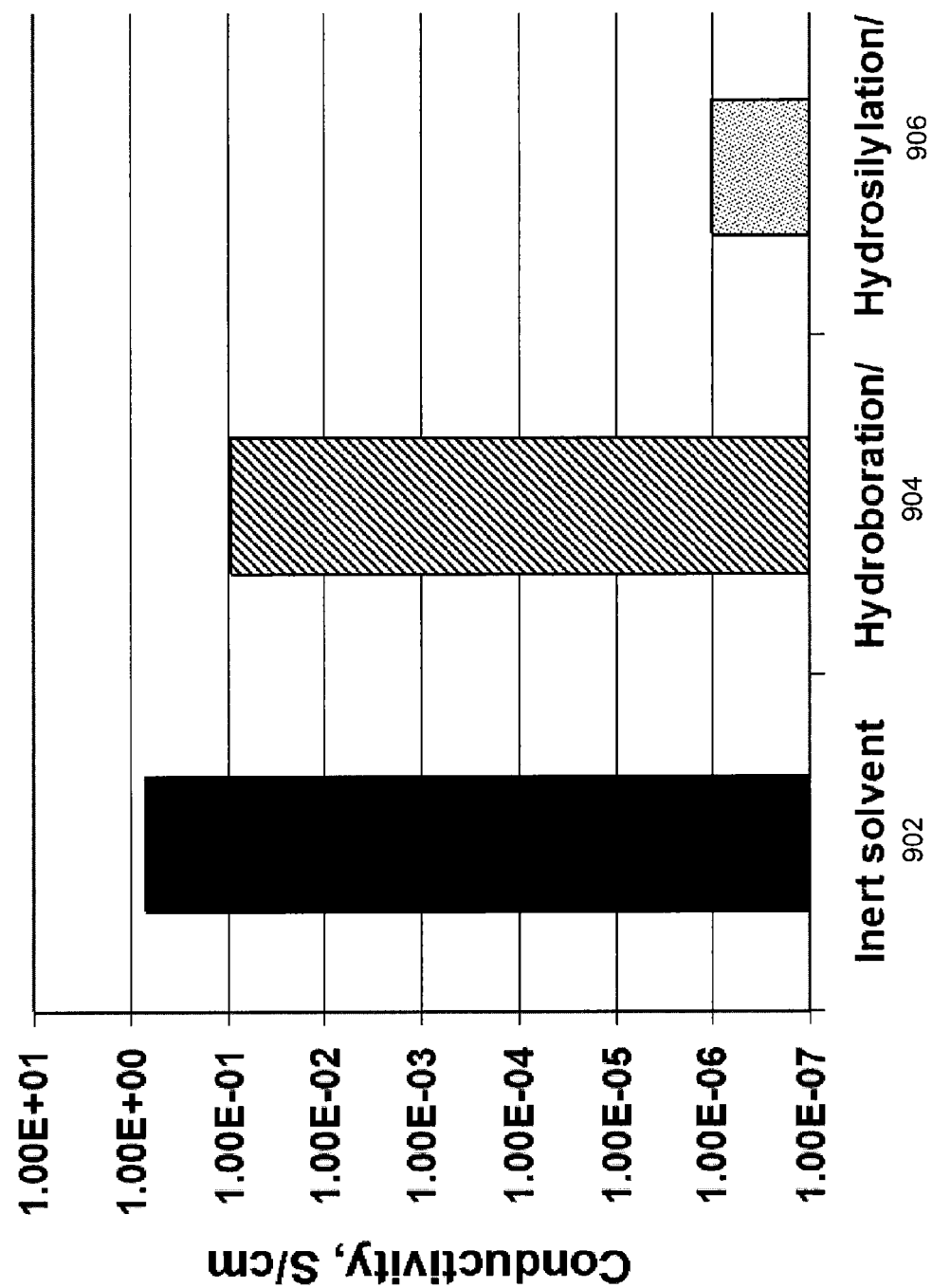

Referring now to FIG. 9, a simplified diagram showing conductivity for a set of densified films made from various capped and uncapped silicon nanoparticles, in accordance with the invention. Conductivity (shown as S(Siemens)/cm on the vertical axis) is generally measured with a four-point probe. Current is made to flow between the outer probes, and voltage V is measured between the two inner probes, ideally without drawing any current.

Here, the appropriate colloidal dispersion was deposited as a film on dielectric (quartz) substrate. The film was then dried on pre-bake step (at about 60-350° C. from about 5 minutes to about 30 minutes) in order to form a porous compact, as well as remove solvents and capping agents. The porous compact was then heated (at between about 800° C. to about 1000° C. and for about 10 seconds to about 10 minutes) in order to sinter the nanoparticles into a densified film on to which the probes are placed. Consequently, it is believed that the lacking selectivity, the excess of bonded capping agents reduce sinterability and hence conductivity.

In general, densified films made from uncapped (inert solvent 902) have relatively high conductivity at about 0.9 $S/cm^2$, which explained by successful adhering of particles to each other in the absence of capping groups (bare surface) during sintering process. In contrast, densified films made from alkyl capped nanoparticles hydrosilylated with an alkene capping agent (hydrosilylation 906) have extremely low conductivity at about 1.00E-6 S/cm$^2$. Such insulating properties are believed resulted from presence of alkyl groups uniformly coating the surface. Brought to the elevated temperatures during sintering process, alkyl groups decompose with formation of carbon at the interphase and thus preventing adhering of Si particles to each other. Densified films made from capped nanoparticles hydroborated with an alkene capping agent (hydroboration 904) have relatively high conductivity at about 1.00E-1 S/cm$^2$, which is comparable to the densified films from uncapped nanoparticles. Thus, hydroboration, incorporating much less alkyl groups on the surface in contrast to hydrosilylation, does not prevent sintering of nanoparticles and gives conductivity comparable to sintering of bare (uncapped) nanoparticles (dispersion in inert solvent).

For the purposes of this disclosure and unless otherwise specified, "a" or "an" means "one or more." All patents, applications, references and publications cited herein are incorporated by reference in their entirety to the same extent as if they were individually incorporated by reference. In addition, the word set refers to a collection of one or more items or objects. Furthermore, the inventors believe that similar to Boron-doped H-passivated Si and Ge semiconductor surfaces selective capping via room temperature interaction of surface Boron-Hydrogen atoms with alkene/alkyne capping ligands can be achieved for H-passivated Group IV semiconductor surfaces caring highly reactive surface Hydride species X—H where X atom can be chosen from Group III (boron [B], aluminum [Al], gallium [Ga], indium [In]), metallic Group IV (tin [Sn], lead [Pb]), and Group V (5 [P], arsenic [As], sulfur [S], and bismuth [Bi]) elements of the Periodic Table.

The invention has been described with reference to various specific and illustrative embodiments. However, it should be understood that many variations and modifications may be made while remaining within the spirit and scope of the invention. Advantages of the invention include the selective functionalization of doped Group IV nanoparticle surfaces.

Having disclosed exemplary embodiments and the best mode, modifications and variations may be made to the disclosed embodiments while remaining within the subject and spirit of the invention as defined by the following claims.

What is claimed is:

1. A method of selectively attaching a capping agent to an H-passivated Si surface comprising a set of covalently bonded Si atoms and a set of surface substitutional atoms, wherein the set of surface substitutional atoms includes at least one of boron atoms, aluminum atoms, gallium atoms, indium atoms, tin atoms, lead atoms, phosphorus atoms, arsenic atoms, sulfur atoms, or bismuth atoms, the method comprising:
   exposing the set of surface substitutional atoms to a set of capping agents, each capping agent of the set of capping agents having a set of functional groups bonded to a pair of carbon atoms, wherein the pair of carbon atoms includes at least one pi orbital bond;
   wherein one or more covalent bonds are formed between one or more surface substitutional atoms of the set of surface substitutional atoms and one or more capping agents of the set of capping agents.

2. The method of claim 1, wherein at least some of the surface substitutional atoms are covalently bonded.

3. The method of claim 1, wherein the capping agent is one of an alkene or an alkyne.

4. The method of claim 1, wherein at least one functional group of the set of functional groups includes hydrogen.

5. The method of claim 1, wherein the H-passivated Si surface defines a Si nanoparticle.

6. The method of claim 1, wherein the Si nanoparticle is manufactured by one of evaporation, gas phase pyrolysis, gas phase photolysis, electrochemical etching, plasma decomposition of silanes, polysilanes, or their analogs of other Group IV atoms, or high pressure liquid phase reduction-oxidation reaction.

7. The method of claim 1, wherein no functional group of the set of functional groups includes hydrogen.

8. The method of claim 1, wherein the set of functional groups includes functional groups having a linear configuration, a branched configuration, or a cyclic configuration.

9. A method of selectively attaching a capping agent to an H-passivated Si surface, the method comprising:
   providing the H-passivated Si surface, the H-passivated Si surface including a set of covalently bonded Si atoms and a set of surface substitutional atoms, wherein the set of surface substitutional atoms includes at least one of boron atoms, aluminum atoms, gallium atoms, indium atoms, tin atoms, lead atoms, phosphorus atoms, arsenic atoms, sulfur atoms, or bismuth atoms;
   exposing the set of surface substitutional atoms to a set of capping agents, each capping agent of the set of capping agents having a set of carbon atoms arranged in an aromatic manner and a set of functional groups attached to at least some of carbon atoms of the set of carbon atoms, wherein the set of carbon atoms includes a set of pi-orbital electrons;
   wherein a set of complexes is formed between at least some surface substitutional atoms of the set of surface substitutional atoms and at least some capping agents of the set of capping agents.

10. The method of claim 9, wherein at least some of the surface substitutional atoms are covalently bonded.

11. The method of claim 9, wherein the Si surface defines a Si nanoparticle.

12. The method of claim 11, wherein the Si nanoparticle is manufactured by one of evaporation, gas phase pyrolysis, gas phase photolysis, electrochemical etching, plasma decomposition of silanes, polysilanes or their analogs of other Group IV atoms, or high pressure liquid phase reduction-oxidation reaction.

13. A method of selectively attaching a capping agent to an H-passivated Ge surface comprising a set of covalently bonded Ge atoms and a set of surface substitutional atoms, wherein the set of surface substitutional atoms includes at least one of boron atoms, aluminum atoms, gallium atoms, indium atoms, tin atoms, lead atoms, phosphorus atoms, arsenic atoms, sulfur atoms, or bismuth atoms the method comprising:
   exposing the set of surface functional atoms to a set of capping agents, each capping agent of the set of capping agents having a set of functional groups bonded to a pair of carbon atoms, wherein the pair of carbon atoms includes at least one pi orbital bond;
   wherein one or more covalent bonds are formed between one or more surface substitutional atoms of the set of surface substitutional atoms and one or more capping agents of the set of capping agents.

14. The method of claim 13, wherein at least some of the surface substitutional atoms are covalently bonded.

15. The method of claim 13, wherein the capping agent is one of an alkene or an alkyne.

16. The method of claim 13, wherein at least one functional group of the set of functional groups includes hydrogen.

17. The method of claim 13, wherein the H-passivated Ge surface defines a Ge nanoparticle.

18. The method of claim 13, wherein the Ge nanoparticle is manufactured by one of evaporation, gas phase pyrolysis, gas phase photolysis, electrochemical etching, plasma decomposition of silanes, polysilanes or their analogs of other Group IV atoms, or high pressure liquid phase reduction-oxidation reaction.

19. The method of claim 13, wherein no functional group of the set of functional groups includes hydrogen.

20. The method of claim 13, wherein the set of functional groups includes functional groups having a linear configuration, a branched configuration, or a cyclic configuration.

21. A method of selectively attaching a capping agent to an H-passivated Ge surface comprising a set of covalently bonded Ge atoms and a set of surface substitutional atoms; wherein the set of surface substitutional atoms includes at least one of boron atoms, aluminum atoms, gallium atoms, indium atoms, tin atoms, lead atoms, phosphorus atoms, arsenic atoms, sulfur atoms, or bismuth atoms, the method comprising:

exposing the set of surface substitutional atoms to a set of capping agents, each capping agent of the set of capping agents having a set or carbon atoms arranged in an aromatic manner and a set of functional groups attached to at least some carbon atoms of the set of carbon atoms, wherein the set of carbon atoms includes a set of pi-orbital electrons;

wherein a set of complexes is formed between at least some surface substitutional atoms of the set of surface substitutional atoms and at least some capping agents of the set of capping agents.

22. The method of claim 21, wherein at least some of the surface substitutional atoms are covalently bonded.

23. The method of claim 21, wherein the Ge surface defines a Ge nanoparticle.

24. The method of claim 21, wherein the Ge nanoparticle is manufactured by one of evaporation, gas phase pyrolysis, gas phase photolysis, electrochemical etching, plasma decomposition of silanes, polysilanes or their analogs of other Group IV atoms, or high pressure liquid phase reduction-oxidation reaction.

* * * * *